United States Patent
Dhuse

(10) Patent No.: US 10,558,592 B2
(45) Date of Patent: *Feb. 11, 2020

(54) PRIORITY LEVEL ADAPTATION IN A DISPERSED STORAGE NETWORK

(71) Applicant: International Business Machines Corporation, Armonk, NY (US)

(72) Inventor: Greg R. Dhuse, Chicago, IL (US)

(73) Assignee: PURE STORAGE, INC., Mountain View, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 16/288,848

(22) Filed: Feb. 28, 2019

(65) Prior Publication Data

US 2019/0266109 A1    Aug. 29, 2019

Related U.S. Application Data

(63) Continuation of application No. 15/255,540, filed on Sep. 2, 2016, now Pat. No. 10,318,445, which is a
(Continued)

(51) Int. Cl.
*G06F 13/16*    (2006.01)
*G06F 16/182*   (2019.01)
(Continued)

(52) U.S. Cl.
CPC .......... *G06F 13/1626* (2013.01); *G06F 3/065* (2013.01); *G06F 3/067* (2013.01);
(Continued)

(58) Field of Classification Search
CPC ............. G06F 13/1626; G06F 13/1663; G06F 3/0608; G06F 3/0611; G06F 3/0641; G06F 3/065; G06F 3/067; G06F 12/0607
(Continued)

(56) References Cited

U.S. PATENT DOCUMENTS 4,092,732 A    5/1978  Ouchi
5,454,101 A    9/1995  Mackay et al.
(Continued)

OTHER PUBLICATIONS

Bian, Jiang, Remzi Seker, and Umit Topaloglu. "A Secure Distributed File System for Medical Image Archiving." In Social Computing (SocialCom), 2010 IEEE Second International Conference on, pp. 961-966. IEEE, 2010.
(Continued)

*Primary Examiner* — Suraj M Joshi
*Assistant Examiner* — Melaku Y Habtemariam
(74) *Attorney, Agent, or Firm* — Garlick & Markison; Timothy W. Markison; Bruce E. Stuckman

(57) ABSTRACT

A processing system in a dispersed storage network is configured to access write sequence information corresponding to a write sequence; determine whether to elevate a priority level of the write sequence; when the processing system determines to elevate the priority level of the write sequence, elevate the priority level of the write sequence; determine whether to lower the priority level of the write sequence; and when the processing system determines to lower the priority level of the write sequence, the processing system lowers the priority level of the write sequence.

20 Claims, 7 Drawing Sheets

Related U.S. Application Data continuation-in-part of application No. 13/683,951, filed on Nov. 21, 2012.

(60) Provisional application No. 61/564,185, filed on Nov. 28, 2011.

(51) Int. Cl.

| | | |
|---|---|---|
| *G06F 3/06* | (2006.01) | |
| *G06F 11/10* | (2006.01) | |
| *G06F 12/06* | (2006.01) | |
| *G06F 21/62* | (2013.01) | |
| *G06F 21/78* | (2013.01) | |
| *H04L 9/08* | (2006.01) | |
| *H04L 9/32* | (2006.01) | |
| *H04L 29/06* | (2006.01) | |
| *H04L 29/08* | (2006.01) | |

(52) U.S. Cl.
CPC .......... *G06F 3/0608* (2013.01); *G06F 3/0611* (2013.01); *G06F 3/0641* (2013.01); *G06F 11/1076* (2013.01); *G06F 12/0607* (2013.01); *G06F 13/1663* (2013.01); *G06F 16/182* (2019.01); *G06F 21/6209* (2013.01); *G06F 21/78* (2013.01); *H04L 9/0825* (2013.01); *H04L 9/3236* (2013.01); *H04L 63/101* (2013.01); *G06F 2211/1028* (2013.01); *H04L 67/1097* (2013.01)

(58) Field of Classification Search
USPC .......................................... 709/203–207, 217
See application file for complete search history.

(56) References Cited

U.S. PATENT DOCUMENTS

| | | | |
|---|---|---|---|
| 5,485,474 | A | 1/1996 | Rabin |
| 5,774,643 | A | 6/1998 | Lubbers et al. |
| 5,802,364 | A | 9/1998 | Senator et al. |
| 5,809,285 | A | 9/1998 | Hilland |
| 5,890,156 | A | 3/1999 | Rekieta et al. |
| 5,987,622 | A | 11/1999 | Lo Verso et al. |
| 5,991,414 | A | 11/1999 | Garay et al. |
| 6,012,159 | A | 1/2000 | Fischer et al. |
| 6,058,454 | A | 5/2000 | Gerlach et al. |
| 6,128,277 | A | 10/2000 | Bruck et al. |
| 6,128,699 | A | 10/2000 | Golding |
| 6,175,571 | B1 | 1/2001 | Haddock et al. |
| 6,192,472 | B1 | 2/2001 | Garay et al. |
| 6,256,688 | B1 | 7/2001 | Suetaka et al. |
| 6,272,658 | B1 | 8/2001 | Steele et al. |
| 6,301,604 | B1 | 10/2001 | Nojima |
| 6,356,949 | B1 | 3/2002 | Katsandres et al. |
| 6,366,995 | B1 | 4/2002 | Vilkov et al. |
| 6,374,336 | B1 | 4/2002 | Peters et al. |
| 6,415,373 | B1 | 7/2002 | Peters et al. |
| 6,418,539 | B1 | 7/2002 | Walker |
| 6,449,688 | B1 | 9/2002 | Peters et al. |
| 6,477,617 | B1 | 11/2002 | Golding |
| 6,567,948 | B2 | 5/2003 | Steele et al. |
| 6,571,282 | B1 | 5/2003 | Bowman-Amuah |
| 6,609,223 | B1 | 8/2003 | Wolfgang |
| 6,718,361 | B1 | 4/2004 | Basani et al. |
| 6,760,808 | B2 | 7/2004 | Peters et al. |
| 6,785,768 | B2 | 8/2004 | Peters et al. |
| 6,785,783 | B2 | 8/2004 | Buckland |
| 6,826,711 | B2 | 11/2004 | Moulton et al. |
| 6,879,596 | B1 | 4/2005 | Dooply |
| 7,003,688 | B1 | 2/2006 | Pittelkow et al. |
| 7,024,451 | B2 | 4/2006 | Jorgenson |
| 7,024,609 | B2 | 4/2006 | Wolfgang et al. |
| 7,080,101 | B1 | 7/2006 | Watson et al. |
| 7,103,824 | B2 | 9/2006 | Halford |
| 7,103,915 | B2 | 9/2006 | Redlich et al. |
| 7,111,115 | B2 | 9/2006 | Peters et al. |
| 7,140,044 | B2 | 11/2006 | Redlich et al. |
| 7,146,644 | B2 | 12/2006 | Redlich et al. |
| 7,171,493 | B2 | 1/2007 | Shu et al. |
| 7,222,133 | B1 | 5/2007 | Raipurkar et al. |
| 7,240,236 | B2 | 7/2007 | Cutts et al. |
| 7,272,613 | B2 | 9/2007 | Sim et al. |
| 7,380,067 | B2 | 5/2008 | Schnapp et al. |
| 7,636,724 | B2 | 12/2009 | de la Torre et al. |
| 7,706,398 | B2 | 4/2010 | Jung et al. |
| 8,584,128 | B1 * | 11/2013 | Don ...................... G06F 9/5011 718/100 |
| 8,850,019 | B2 | 9/2014 | Bernbo et al. |
| 2002/0062422 | A1 | 5/2002 | Butterworth et al. |
| 2002/0162047 | A1 | 10/2002 | Peters et al. |
| 2002/0166079 | A1 | 11/2002 | Ulrich et al. |
| 2003/0018927 | A1 | 1/2003 | Gadir et al. |
| 2003/0037261 | A1 | 2/2003 | Meffert et al. |
| 2003/0065617 | A1 | 4/2003 | Watkins et al. |
| 2003/0084020 | A1 | 5/2003 | Shu |
| 2004/0024963 | A1 | 2/2004 | Talagala et al. |
| 2004/0122917 | A1 | 6/2004 | Menon et al. |
| 2004/0139286 | A1 | 7/2004 | Lin et al. |
| 2004/0205297 | A1 * | 10/2004 | Bearden .............. G06F 12/0804 711/133 |
| 2004/0215998 | A1 | 10/2004 | Buxton et al. |
| 2004/0228493 | A1 | 11/2004 | Ma |
| 2005/0100022 | A1 | 5/2005 | Ramprashad |
| 2005/0114594 | A1 | 5/2005 | Corbett et al. |
| 2005/0125593 | A1 | 6/2005 | Karpoff et al. |
| 2005/0131993 | A1 | 6/2005 | Fatula |
| 2005/0132070 | A1 | 6/2005 | Redlich et al. |
| 2005/0144382 | A1 | 6/2005 | Schmisseur |
| 2005/0229069 | A1 | 10/2005 | Hassner et al. |
| 2006/0047907 | A1 | 3/2006 | Shiga et al. |
| 2006/0136448 | A1 | 6/2006 | Cialini et al. |
| 2006/0156059 | A1 | 7/2006 | Kitamura |
| 2006/0224603 | A1 | 10/2006 | Correll |
| 2007/0079081 | A1 | 4/2007 | Gladwin et al. |
| 2007/0079082 | A1 | 4/2007 | Gladwin et al. |
| 2007/0079083 | A1 | 4/2007 | Gladwin et al. |
| 2007/0088970 | A1 | 4/2007 | Buxton et al. |
| 2007/0174192 | A1 | 7/2007 | Gladwin et al. |
| 2007/0214285 | A1 | 9/2007 | Au et al. |
| 2007/0234110 | A1 | 10/2007 | Soran et al. |
| 2007/0283167 | A1 | 12/2007 | Venters et al. |
| 2008/0183975 | A1 | 7/2008 | Foster et al. |
| 2008/0263113 | A1 | 10/2008 | Krishnaiyer et al. |
| 2008/0270657 | A1 | 10/2008 | Tsai et al. |
| 2009/0094250 | A1 | 4/2009 | Dhuse et al. |
| 2009/0094251 | A1 | 4/2009 | Gladwin et al. |
| 2009/0094318 | A1 | 4/2009 | Gladwin et al. |
| 2009/0094320 | A1 | 4/2009 | Palthepu et al. |
| 2009/0106411 | A1 | 4/2009 | Lisiecki et al. |
| 2009/0150624 | A1 | 6/2009 | Resnick |
| 2010/0023524 | A1 | 1/2010 | Gladwin et al. |
| 2010/0144329 | A1 | 6/2010 | Lasensky et al. |
| 2010/0218037 | A1 | 8/2010 | Swartz et al. |
| 2010/0268692 | A1 | 10/2010 | Resch |
| 2010/0268877 | A1 | 10/2010 | Resch et al. |
| 2011/0107036 | A1 | 5/2011 | Resch et al. |
| 2011/0116610 | A1 | 5/2011 | Shaw et al. |
| 2011/0276763 | A1 * | 11/2011 | Daly .................... G06F 12/0888 711/122 |
| 2013/0091102 | A1 * | 4/2013 | Nayak .................. G06F 3/0613 707/692 |
| 2013/0111077 | A1 | 5/2013 | Gowravaram et al. |
| 2013/0124805 | A1 * | 5/2013 | Rafacz ................ G06F 13/1626 711/151 |

OTHER PUBLICATIONS

Chung; An Automatic Data Segmentation Method for 3D Measured Data Points; National Taiwan University; pp. 1-8; 1998.

Decandia, Giuseppe, et al. "Dynamo: Amazons Highly Available Key-Value Store." ACM SIGOPS Operating Systems Review. vol. 41. No. 6. ACM, 2007.

(56) References Cited

OTHER PUBLICATIONS

Harrison; Lightweight Directory Access Protocol (LDAP): Authentication Methods and Security Mechanisms; IETF Network Working Group; RFC 4513; Jun. 2006; pp. 1-32.

Kubiatowicz, et al.; OceanStore: An Architecture for Global-Scale Persistent Storage; Proceedings of the Ninth International Conference on Architectural Support for Programming Languages and Operating Systems (ASPLOS 2000); Nov. 2000; pp. 1-12.

Legg; Lightweight Directory Access Protocol (LDAP): Syntaxes and Matching Rules; IETF Network Working Group; RFC 4517; Jun. 2006; pp. 1-50.

Plank, T1: Erasure Codes for Storage Applications; FAST2005, 4th Usenix Conference on File Storage Technologies; Dec. 13-16, 2005; pp. 1-74.

Rabin; Efficient Dispersal of Information for Security, Load Balancing, and Fault Tolerance; Journal of the Association for Computer Machinery; vol. 36, No. 2; Apr. 1989; pp. 335-348.

Satran, et al.; Internet Small Computer Systems Interface (iSCSI); IETF Network Working Group; RFC 3720; Apr. 2004; pp. 1-257.

Sciberras; Lightweight Directory Access Protocol (LDAP): Schema for User Applications; IETF Network Working Group; RFC 4519; Jun. 2006; pp. 1-33.

Sermersheim; Lightweight Directory Access Protocol (LDAP): The Protocol; IETF Network Working Group; RFC 4511; Jun. 2006; pp. 1-68.

Shamir; How to Share a Secret; Communications of the ACM; vol. 22, No. 11; Nov. 1979; pp. 612-613.

Shvachko, Konstantin, et al. "The Hadoop Distributed File System." Mass Storage Systems and Technologies (MSST), 2010 IEEE 26th Symposium. IEEE, 2010.

Smith; Lightweight Directory Access Protocol (LDAP): String Representation of Search Filters; IETF Network Working Group; RFC 4515; Jun. 2006; pp. 1-12.

Smith; Lightweight Directory Access Protocol (LDAP): Uniform Resource Locator; IETF Network Working Group; RFC 4516; Jun. 2006; pp. 1-15.

Wildi; Java iSCSi Initiator; Master Thesis; Department of Computer and Information Science, University of Konstanz; Feb. 2007; 60 pgs.

Xin, et al.; Evaluation of Distributed Recovery in Large-Scale Storage Systems; 13th IEEE International Symposium on High Performance Distributed Computing; Jun. 2004; pp. 172-181.

Zeilenga; Lightweight Directory Access Protocol (LDAP): Technical Specification Road Map; IETF Network Working Group; RFC 4510; Jun. 2006; pp. 1-8.

Zeilenga; Lightweight Directory Access Protocol (LDAP): Directory Information Models; IETF Network Working Group; RFC 4512; Jun. 2006; pp. 1-49.

Zeilenga; Lightweight Directory Access Protocol (LDAP): Internationalized String Preparation; IETF Network Working Group; RFC 4518; Jun. 2006; pp. 1-14.

Zeilenga; Lightweight Directory Access Protocol (LDAP): String Representation of Distinguished Names; IETF Network Working Group; RFC 4514; Jun. 2006; pp. 1-15.

\* cited by examiner distributed, or dispersed, storage network (DSN) 10

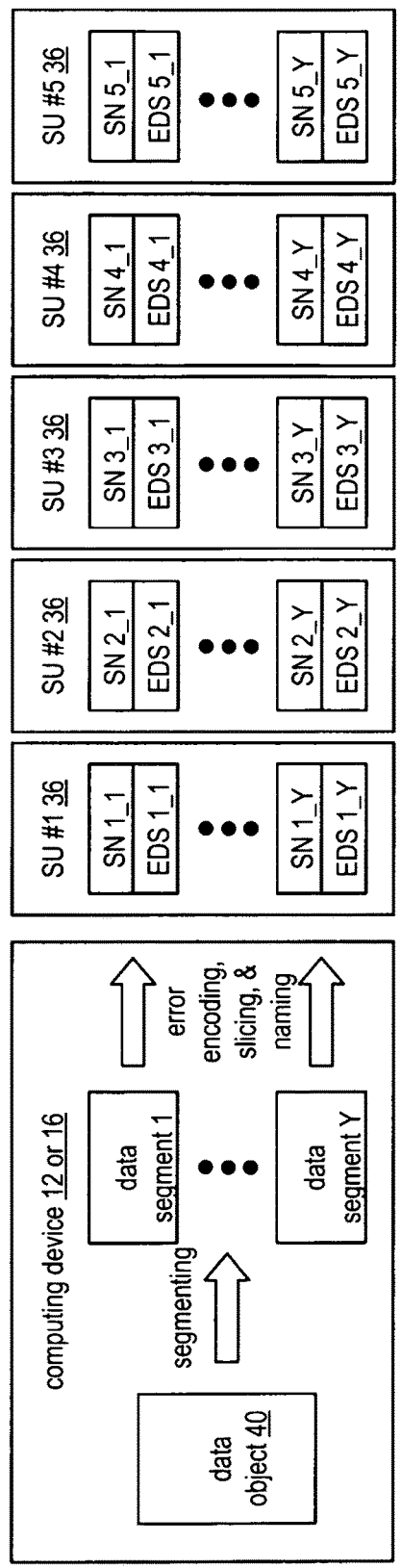
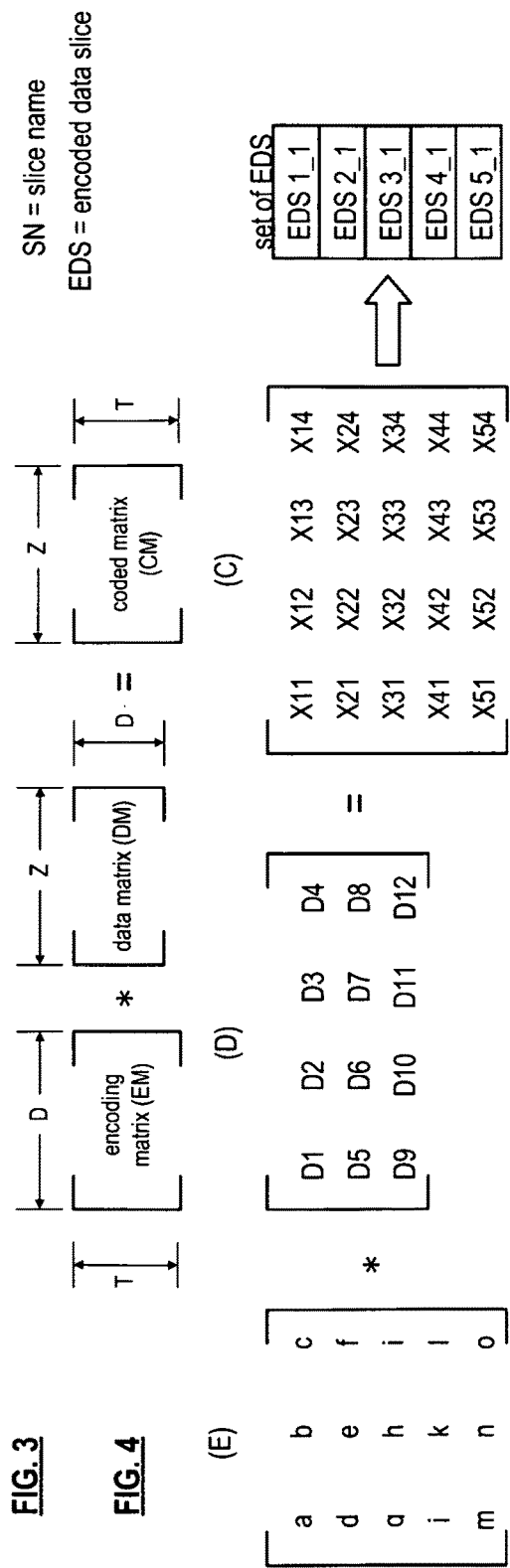
FIG. 3
FIG. 4
FIG. 5
FIG. 6

PRIORITY LEVEL ADAPTATION IN A DISPERSED STORAGE NETWORK

CROSS-REFERENCE TO RELATED APPLICATIONS

The present U.S. Utility patent application claims priority pursuant to 35 U.S.C. § 120 as a continuation of U.S. Utility application Ser. No. 15/255,540, entitled "PRIORITY LEVEL ADAPTATION IN A DISPERSED STORAGE NETWORK", filed Sep. 2, 2016, which is a continuation-in-part of U.S. Utility application Ser. No. 13/683,951, entitled "PRIORITIZATION OF MESSAGES OF A DISPERSED STORAGE NETWORK", filed Nov. 21, 2012, which claims priority pursuant to 35 U.S.C. § 119(e) to U.S. Provisional Application No. 61/564,185, entitled "OPTIMIZING PERFORMANCE OF DISPERSED STORAGE NETWORK", filed Nov. 28, 2011, all of which are hereby incorporated herein by reference in their entirety and made part of the present U.S. Utility patent application for all purposes.

STATEMENT REGARDING FEDERALLY SPONSORED RESEARCH OR DEVELOPMENT

Not applicable.

INCORPORATION-BY-REFERENCE OF MATERIAL SUBMITTED ON A COMPACT DISC

Not applicable.

BACKGROUND OF THE INVENTION

Technical Field of the Invention

This invention relates generally to computer networks and more particularly to dispersing error encoded data.

Description of Related Art

Computing devices are known to communicate data, process data, and/or store data. Such computing devices range from wireless smart phones, laptops, tablets, personal computers (PC), work stations, and video game devices, to data centers that support millions of web searches, stock trades, or on-line purchases every day. In general, a computing device includes a central processing unit (CPU), a memory system, user input/output interfaces, peripheral device interfaces, and an interconnecting bus structure.

As is further known, a computer may effectively extend its CPU by using "cloud computing" to perform one or more computing functions (e.g., a service, an application, an algorithm, an arithmetic logic function, etc.) on behalf of the computer. Further, for large services, applications, and/or functions, cloud computing may be performed by multiple cloud computing resources in a distributed manner to improve the response time for completion of the service, application, and/or function. For example, Hadoop is an open source software framework that supports distributed applications enabling application execution by thousands of computers.

In addition to cloud computing, a computer may use "cloud storage" as part of its memory system. As is known, cloud storage enables a user, via its computer, to store files, applications, etc. on an Internet storage system. The Internet storage system may include a RAID (redundant array of independent disks) system and/or a dispersed storage system that uses an error correction scheme to encode data for storage.

BRIEF DESCRIPTION OF THE SEVERAL VIEWS OF THE DRAWING(S)

FIG. 3 is a schematic block diagram of an example of dispersed storage error encoding of data in accordance with the present invention;

FIG. 4 is a schematic block diagram of a generic example of an error encoding function in accordance with the present invention;

FIG. 5 is a schematic block diagram of a specific example of an error encoding function in accordance with the present invention;

FIG. 6 is a schematic block diagram of an example of a slice name of an encoded data slice (EDS) in accordance with the present invention;

DETAILED DESCRIPTION OF THE INVENTION

Figure 1:
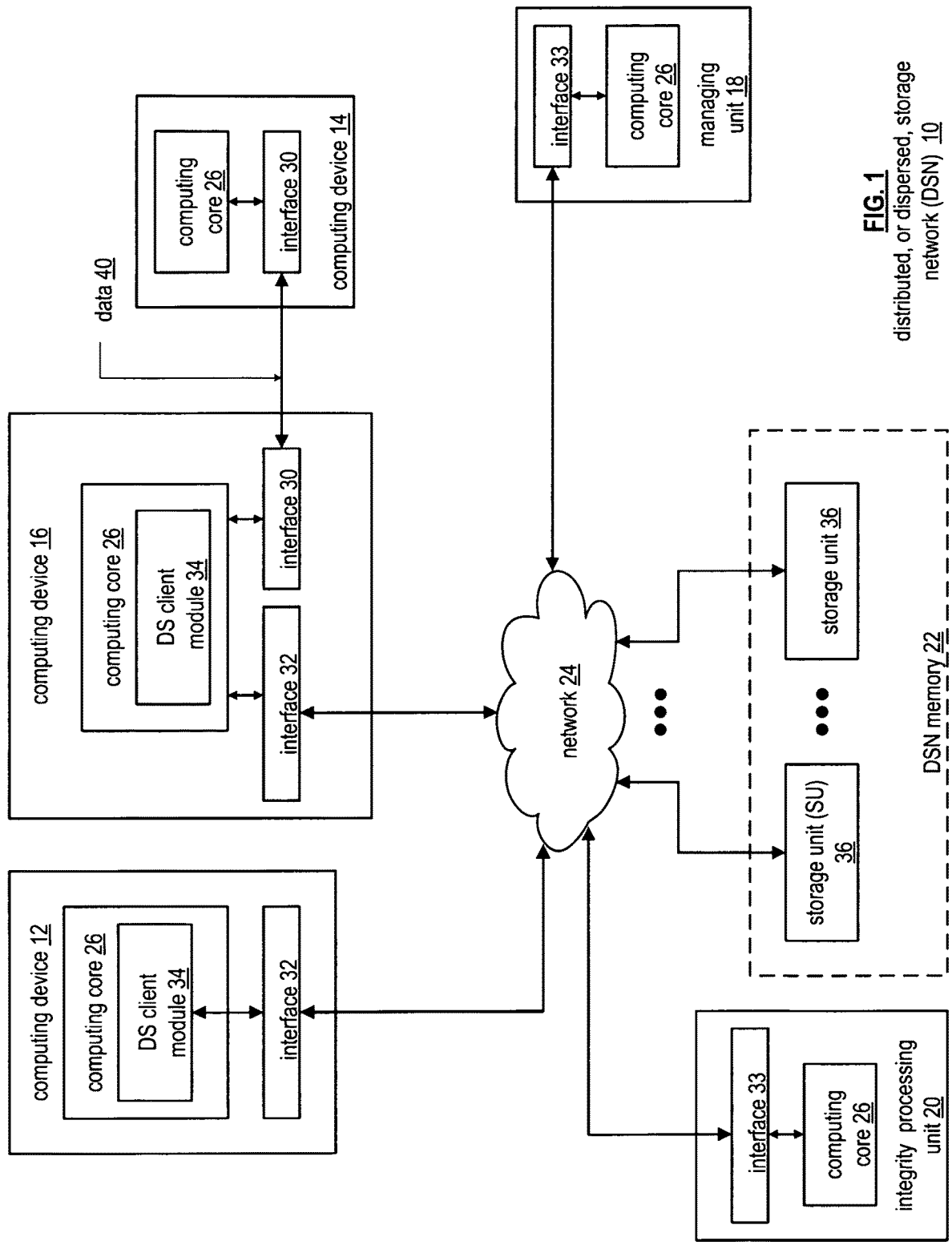
FIG. 1 is a schematic block diagram of an embodiment of a dispersed or distributed storage network (DSN) in accordance with the present invention.

FIG. 1 is a schematic block diagram of an embodiment of a dispersed, or distributed, storage network (DSN) 10 that includes a plurality of computing devices 12-16, a managing unit 18, an integrity processing unit 20, and a DSN memory 22. The components of the DSN 10 are coupled to a network 24, which may include one or more wireless and/or wire lined communication systems; one or more non-public intranet systems and/or public internet systems; and/or one or more local area networks (LAN) and/or wide area networks (WAN).

Figure 2:
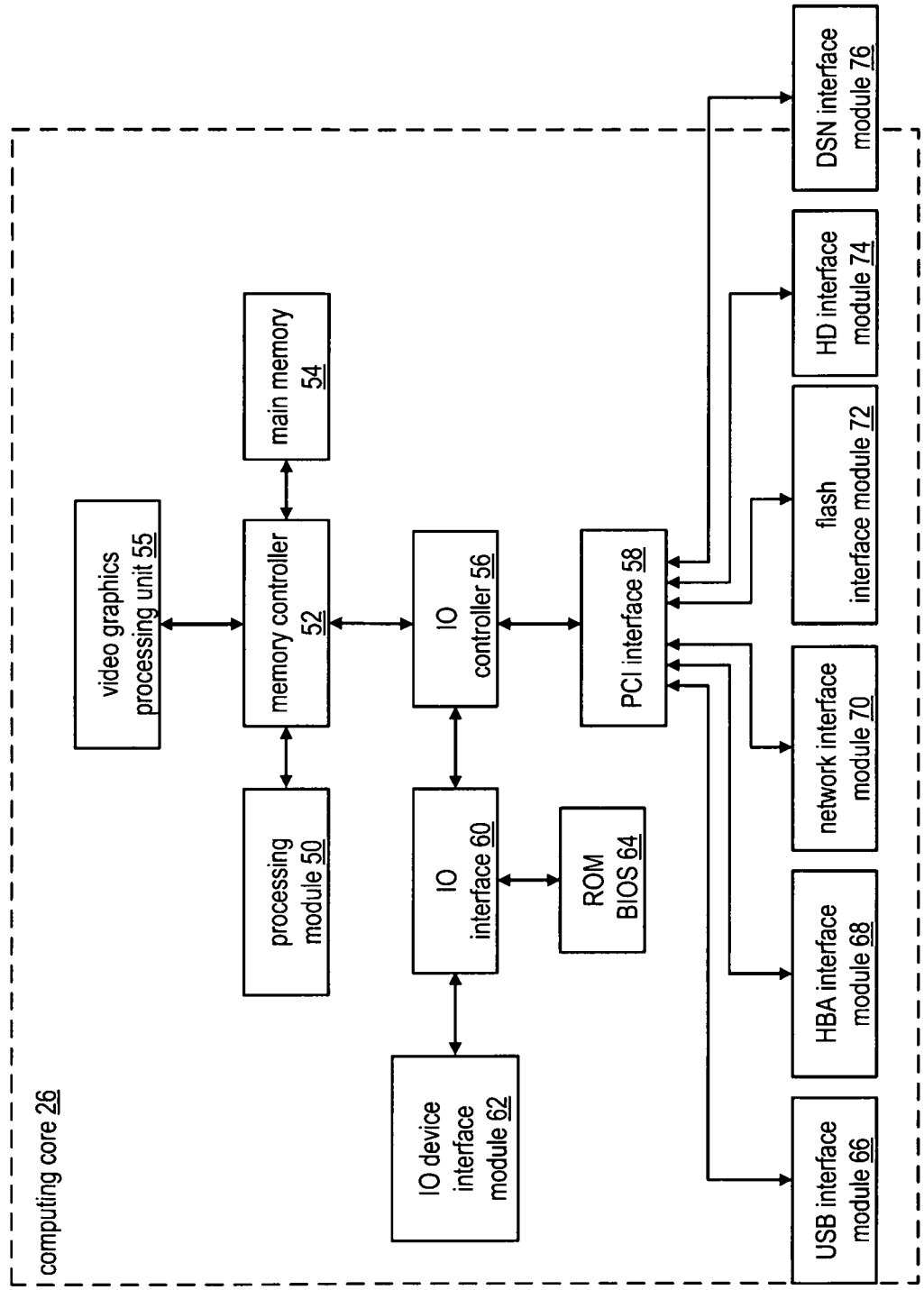
FIG. 2 is a schematic block diagram of an embodiment of a computing core in accordance with the present invention.

The DSN memory 22 includes a plurality of storage units 36 that may be located at geographically different sites (e.g., one in Chicago, one in Milwaukee, etc.), at a common site, or a combination thereof. For example, if the DSN memory 22 includes eight storage units 36, each storage unit is located at a different site. As another example, if the DSN memory 22 includes eight storage units 36, all eight storage units are located at the same site. As yet another example, if the DSN memory 22 includes eight storage units 36, a first pair of storage units are at a first common site, a second pair of storage units are at a second common site, a third pair of storage units are at a third common site, and a fourth pair of storage units are at a fourth common site. Note that a DSN memory 22 may include more or less than eight storage units 36. Further note that each storage unit 36 includes a computing core (as shown in FIG. 2, or components thereof) and a plurality of memory devices for storing dispersed error encoded data.

In various embodiments, each of the storage units operates as a distributed storage and task (DST) execution unit, and is operable to store dispersed error encoded data and/or to execute, in a distributed manner, one or more tasks on data. The tasks may be a simple function (e.g., a mathematical function, a logic function, an identify function, a find function, a search engine function, a replace function, etc.), a complex function (e.g., compression, human and/or computer language translation, text-to-voice conversion, voice-to-text conversion, etc.), multiple simple and/or complex functions, one or more algorithms, one or more applications, etc. Hereafter, a storage unit may be interchangeably referred to as a DST execution unit and a set of storage units may be interchangeably referred to as a set of DST execution units.

Each of the computing devices 12-16, the managing unit 18, and the integrity processing unit 20 include a computing core 26, which includes network interfaces 30-33. Computing devices 12-16 may each be a portable computing device and/or a fixed computing device. A portable computing device may be a social networking device, a gaming device, a cell phone, a smart phone, a digital assistant, a digital music player, a digital video player, a laptop computer, a handheld computer, a tablet, a video game controller, and/or any other portable device that includes a computing core. A fixed computing device may be a computer (PC), a computer server, a cable set-top box, a satellite receiver, a television set, a printer, a fax machine, home entertainment equipment, a video game console, and/or any type of home or office computing equipment. Note that each of the managing unit 18 and the integrity processing unit 20 may be separate computing devices, may be a common computing device, and/or may be integrated into one or more of the computing devices 12-16 and/or into one or more of the storage units 36.

Each interface 30, 32, and 33 includes software and hardware to support one or more communication links via the network 24 indirectly and/or directly. For example, interface 30 supports a communication link (e.g., wired, wireless, direct, via a LAN, via the network 24, etc.) between computing devices 14 and 16. As another example, interface 32 supports communication links (e.g., a wired connection, a wireless connection, a LAN connection, and/or any other type of connection to/from the network 24) between computing devices 12 & 16 and the DSN memory 22. As yet another example, interface 33 supports a communication link for each of the managing unit 18 and the integrity processing unit 20 to the network 24.

Computing devices 12 and 16 include a dispersed storage (DS) client module 34, which enables the computing device to dispersed storage error encode and decode data as subsequently described with reference to one or more of FIGS. 3-8. In this example embodiment, computing device 16 functions as a dispersed storage processing agent for computing device 14. In this role, computing device 16 dispersed storage error encodes and decodes data on behalf of computing device 14. With the use of dispersed storage error encoding and decoding, the DSN 10 is tolerant of a significant number of storage unit failures (the number of failures is based on parameters of the dispersed storage error encoding function) without loss of data and without the need for a redundant or backup copies of the data. Further, the DSN 10 stores data for an indefinite period of time without data loss and in a secure manner (e.g., the system is very resistant to unauthorized attempts at accessing the data).

In operation, the managing unit 18 performs DS management services. For example, the managing unit 18 establishes distributed data storage parameters (e.g., vault creation, distributed storage parameters, security parameters, billing information, user profile information, etc.) for computing devices 12-14 individually or as part of a group of user devices. As a specific example, the managing unit 18 coordinates creation of a vault (e.g., a virtual memory block associated with a portion of an overall namespace of the DSN) within the DSN memory 22 for a user device, a group of devices, or for public access and establishes per vault dispersed storage (DS) error encoding parameters for a vault. The managing unit 18 facilitates storage of DS error encoding parameters for each vault by updating registry information of the DSN 10, where the registry information may be stored in the DSN memory 22, a computing device 12-16, the managing unit 18, and/or the integrity processing unit 20.

The DSN managing unit 18 creates and stores user profile information (e.g., an access control list (ACL)) in local memory and/or within memory of the DSN memory 22. The user profile information includes authentication information, permissions, and/or the security parameters. The security parameters may include encryption/decryption scheme, one or more encryption keys, key generation scheme, and/or data encoding/decoding scheme.

The DSN managing unit 18 creates billing information for a particular user, a user group, a vault access, public vault access, etc. For instance, the DSN managing unit 18 tracks the number of times a user accesses a non-public vault and/or public vaults, which can be used to generate a per-access billing information. In another instance, the DSN managing unit 18 tracks the amount of data stored and/or retrieved by a user device and/or a user group, which can be used to generate a per-data-amount billing information.

As another example, the managing unit 18 performs network operations, network administration, and/or network maintenance. Network operations includes authenticating user data allocation requests (e.g., read and/or write requests), managing creation of vaults, establishing authentication credentials for user devices, adding/deleting components (e.g., user devices, storage units, and/or computing devices with a DS client module 34) to/from the DSN 10, and/or establishing authentication credentials for the storage units 36. Network administration includes monitoring devices and/or units for failures, maintaining vault information, determining device and/or unit activation status, determining device and/or unit loading, and/or determining any other system level operation that affects the performance level of the DSN 10. Network maintenance includes facilitating replacing, upgrading, repairing, and/or expanding a device and/or unit of the DSN 10.

The integrity processing unit 20 performs rebuilding of 'bad' or missing encoded data slices. At a high level, the integrity processing unit 20 performs rebuilding by periodically attempting to retrieve/list encoded data slices, and/or slice names of the encoded data slices, from the DSN memory 22. For retrieved encoded slices, they are checked for errors due to data corruption, outdated version, etc. If a slice includes an error, it is flagged as a 'bad' slice. For encoded data slices that were not received and/or not listed, they are flagged as missing slices. Bad and/or missing slices are subsequently rebuilt using other retrieved encoded data slices that are deemed to be good slices to produce rebuilt slices. The rebuilt slices are stored in the DSN memory 22.

FIG. 2 is a schematic block diagram of an embodiment of a computing core 26 that includes a processing module 50, a memory controller 52, main memory 54, a video graphics processing unit 55, an input/output (IO) controller 56, a peripheral component interconnect (PCI) interface 58, an 10 interface module 60, at least one 10 device interface module 62, a read only memory (ROM) basic input output system (BIOS) 64, and one or more memory interface modules. The one or more memory interface module(s) includes one or more of a universal serial bus (USB) interface module 66, a host bus adapter (HBA) interface module 68, a network interface module 70, a flash interface module 72, a hard drive interface module 74, and a DSN interface module 76.

The DSN interface module 76 functions to mimic a conventional operating system (OS) file system interface (e.g., network file system (NFS), flash file system (FFS), disk file system (DFS), file transfer protocol (FTP), web-based distributed authoring and versioning (WebDAV), etc.) and/or a block memory interface (e.g., small computer system interface (SCSI), internet small computer system interface (iSCSI), etc.). The DSN interface module 76 and/or the network interface module 70 may function as one or more of the interface 30-33 of FIG. 1. Note that the IO device interface module 62 and/or the memory interface modules 66-76 may be collectively or individually referred to as IO ports.

FIG. 3 is a schematic block diagram of an example of dispersed storage error encoding of data. When a computing device 12 or 16 has data to store it disperse storage error encodes the data in accordance with a dispersed storage error encoding process based on dispersed storage error encoding parameters. Here, the computing device stores data object 40, which can include a file (e.g., text, video, audio, etc.), or other data arrangement. The dispersed storage error encoding parameters include an encoding function (e.g., information dispersal algorithm, Reed-Solomon, Cauchy Reed-Solomon, systematic encoding, non-systematic encoding, on-line codes, etc.), a data segmenting protocol (e.g., data segment size, fixed, variable, etc.), and per data segment encoding values. The per data segment encoding values include a total, or pillar width, number (T) of encoded data slices per encoding of a data segment i.e., in a set of encoded data slices); a decode threshold number (D) of encoded data slices of a set of encoded data slices that are needed to recover the data segment; a read threshold number (R) of encoded data slices to indicate a number of encoded data slices per set to be read from storage for decoding of the data segment; and/or a write threshold number (W) to indicate a number of encoded data slices per set that must be accurately stored before the encoded data segment is deemed to have been properly stored. The dispersed storage error encoding parameters may further include slicing information (e.g., the number of encoded data slices that will be created for each data segment) and/or slice security information (e.g., per encoded data slice encryption, compression, integrity checksum, etc.).

In the present example, Cauchy Reed-Solomon has been selected as the encoding function (a generic example is shown in FIG. 4 and a specific example is shown in FIG. 5); the data segmenting protocol is to divide the data object into fixed sized data segments; and the per data segment encoding values include: a pillar width of 5, a decode threshold of 3, a read threshold of 4, and a write threshold of 4. In accordance with the data segmenting protocol, the computing device 12 or 16 divides data object 40 into a plurality of fixed sized data segments (e.g., 1 through Y of a fixed size in range of Kilo-bytes to Tera-bytes or more). The number of data segments created is dependent of the size of the data and the data segmenting protocol.

The computing device 12 or 16 then disperse storage error encodes a data segment using the selected encoding function (e.g., Cauchy Reed-Solomon) to produce a set of encoded data slices. FIG. 4 illustrates a generic Cauchy Reed-Solomon encoding function, which includes an encoding matrix (EM), a data matrix (DM), and a coded matrix (CM). The size of the encoding matrix (EM) is dependent on the pillar width number (T) and the decode threshold number (D) of selected per data segment encoding values. To produce the data matrix (DM), the data segment is divided into a plurality of data blocks and the data blocks are arranged into D number of rows with Z data blocks per row. Note that Z is a function of the number of data blocks created from the data segment and the decode threshold number (D). The coded matrix is produced by matrix multiplying the data matrix by the encoding matrix.

FIG. 5 illustrates a specific example of Cauchy Reed-Solomon encoding with a pillar number (T) of five and decode threshold number of three. In this example, a first data segment is divided into twelve data blocks (D1-D12). The coded matrix includes five rows of coded data blocks, where the first row of X11-X14 corresponds to a first encoded data slice (EDS 1_1), the second row of X21-X24 corresponds to a second encoded data slice (EDS 2_1), the third row of X31-X34 corresponds to a third encoded data slice (EDS 3_1), the fourth row of X41-X44 corresponds to a fourth encoded data slice (EDS 4_1), and the fifth row of X51-X54 corresponds to a fifth encoded data slice (EDS 5_1). Note that the second number of the EDS designation corresponds to the data segment number.

Returning to the discussion of FIG. 3, the computing device also creates a slice name (SN) for each encoded data slice (EDS) in the set of encoded data slices. A typical format for a slice name 80 is shown in FIG. 6. As shown, the slice name (SN) 80 includes a pillar number of the encoded data slice (e.g., one of 1-T), a data segment number (e.g., one of 1-Y), a vault identifier (ID), a data object identifier (ID), and may further include revision level information of the encoded data slices. The slice name functions as, at least part of, a DSN address for the encoded data slice for storage and retrieval from the DSN memory 22.

As a result of encoding, the computing device 12 or 16 produces a plurality of sets of encoded data slices, which are provided with their respective slice names to the storage units for storage. As shown, the first set of encoded data slices includes EDS 1_1 through EDS 5_1 and the first set of slice names includes SN 1_1 through SN 5_1 and the last set of encoded data slices includes EDS 1_Y through EDS 5_Y and the last set of slice names includes SN 1_Y through SN 5_Y.

Figures 7, 8:
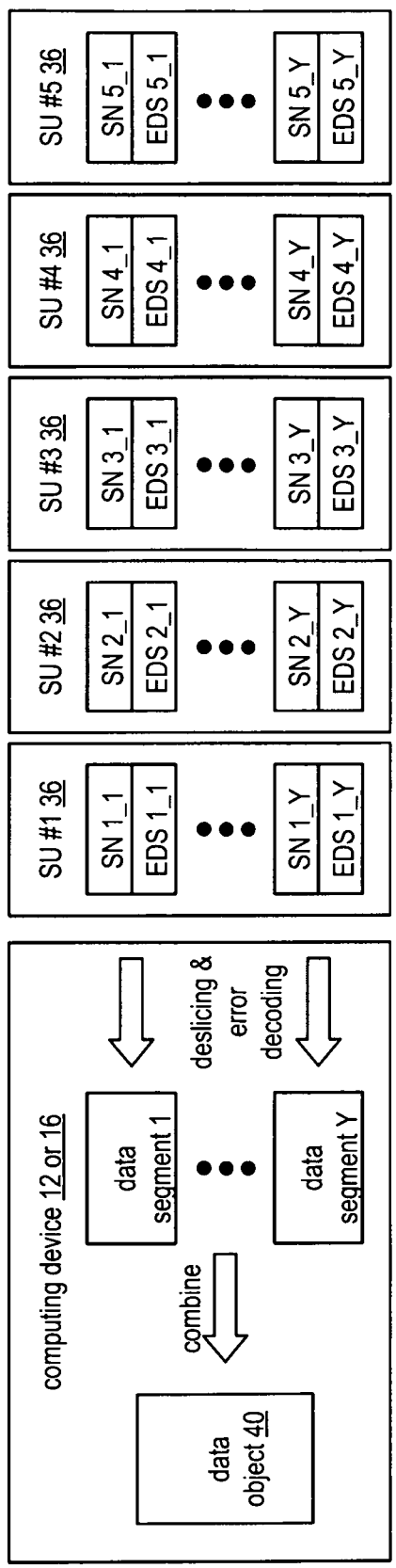
FIG. 7 is a schematic block diagram of an example of dispersed storage error decoding of data in accordance with the present invention.
FIG. 8 is a schematic block diagram of a generic example of an error decoding function in accordance with the present invention.

FIG. 7 is a schematic block diagram of an example of dispersed storage error decoding of a data object that was dispersed storage error encoded and stored in the example of FIG. 4. In this example, the computing device 12 or 16 retrieves from the storage units at least the decode threshold number of encoded data slices per data segment. As a specific example, the computing device retrieves a read threshold number of encoded data slices.

To recover a data segment from a decode threshold number of encoded data slices, the computing device uses a decoding function as shown in FIG. 8. As shown, the decoding function is essentially an inverse of the encoding function of FIG. 4. The coded matrix includes a decode threshold number of rows (e.g., three in this example) and the decoding matrix in an inversion of the encoding matrix that includes the corresponding rows of the coded matrix. For example, if the coded matrix includes rows 1, 2, and 4, the encoding matrix is reduced to rows 1, 2, and 4, and then inverted to produce the decoding matrix.

Figure 9A:
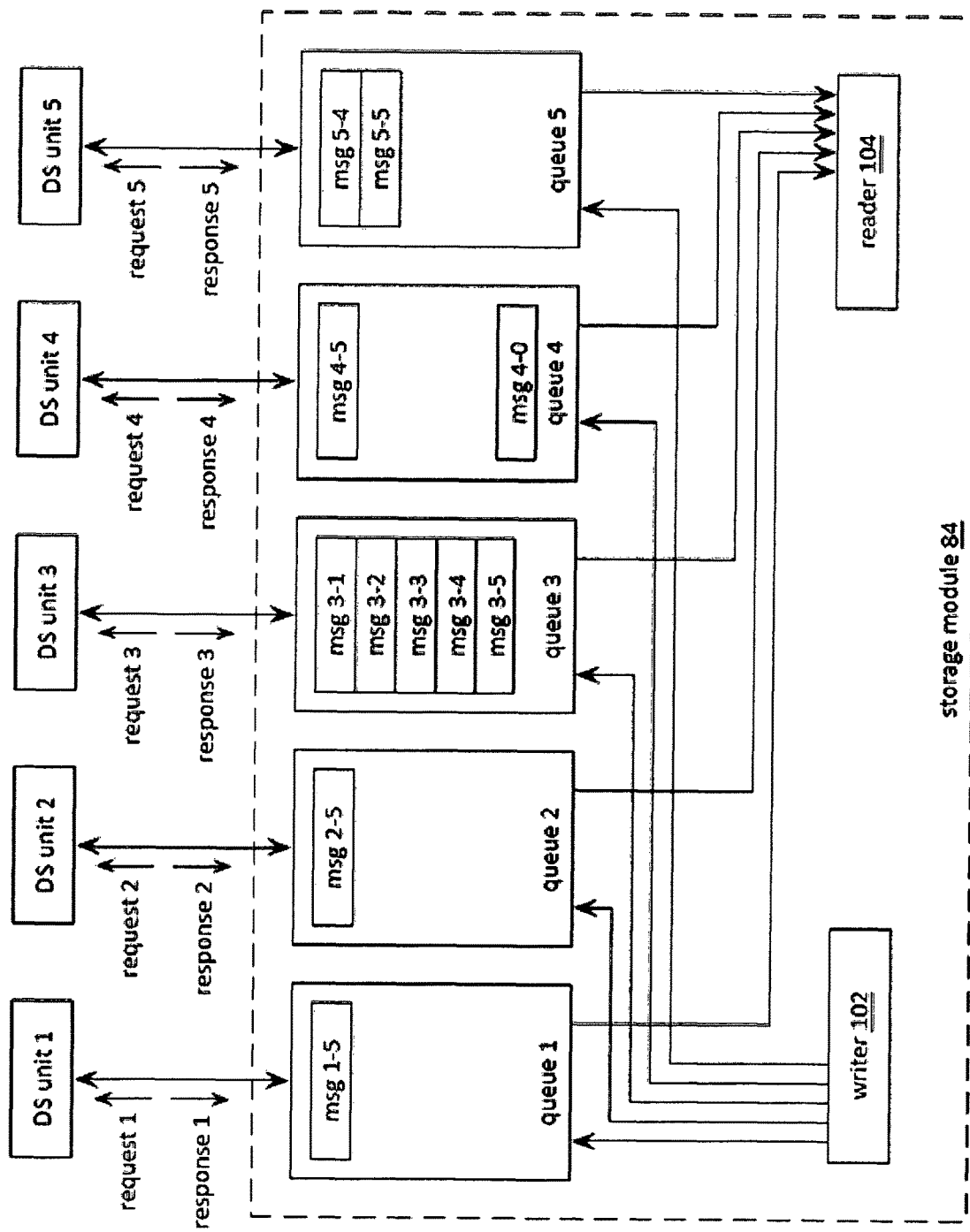
FIG. 9A is a schematic block diagram of an embodiment of storage module in accordance with the present invention.

FIG. 9A is a schematic block diagram of an embodiment of a storage module 84 that includes a writer 102, a reader 104, and queues 1-5. The storage module 84 can be implemented via a computing device 16 of FIG. 1, the network 24 of FIG. 1. The computing device 16 can function as a dispersed storage processing agent for computing device 14 as described previously, and may hereafter be referred to as a distributed storage and task (DST) processing unit. Each dispersed storage (DS) unit 1-5 may be implemented utilizing the storage unit 36 of FIG. 1. While the DST processing unit is described below in conjunction with the operation of computing unit 16, the operates may likewise be performed by other DST processing units, including integrity processing unit 20 and/or managing unit 18 of FIG. 1.

The writer 102 generates messages for transmission to one or more DS units of DS units 1-5. The reader 104 interprets messages received from the one or more DS units of DS units 1-5. The messages include request messages and response messages. Messages transmitted from the storage module 84 to DS units 1-5 include requests 1-5. Messages that the storage module 84 receives from DS units 1-5 include responses 1-5.

Each queue of queues 1-5 may be implemented as one or more of a physical memory device, a plurality of memory devices, and a virtual allocation of storage capacity of one or more memory devices. Each queue may be associated with a fixed storage capacity. Each queue of queues 1-5 temporarily stores messages received from a DS unit waiting to be processed by the reader 104 or messages from the writer 102 to be transmitted to a DS unit. For example, the writer 102 stores message 3-5 in queue 3 for transmission to DS unit 3. Message 3-5 are sent to DS unit 3 via a network when message 3-5 are to be transmitted in accordance with a queue prioritization scheme.

The queue prioritization scheme may be based on one or more of a number of messages associated with the queue (e.g., pending messages), a prioritization approach (e.g., first in first out (FIFO), last in last out (LIFO)), a prioritization level associated with each of the messages associated with the queue, a network performance level, a DS unit performance level, and an order of message receipt by the queue. For instance, queue 3 outputs message 3-5 to DS unit 3 when messages 3-1 through 3-4 have been successfully sent in accordance with a FIFO prioritization approach of the queue prioritization scheme. As another instance, queue 3 outputs message 3-5 to DS unit 3 when message 3-1 has been successfully sent and prior to sending of messages 3-2 through 3-4 when a prioritization level associated with message 3-5 is greater than a privatization level associated with messages 3-2 through 3-4 and the prioritization level associated with message 3-5 is lower than a privatization level associated with message 3-1. As another example, queue 4 receives message 4-0 from DS unit 4 to be read by the reader 104. Queue 4 outputs message 4-0 to the reader 104 in accordance with the queue prioritization scheme.

The storage module 84 may delete a message stored in a queue when the message is outputted and is no longer required. The storage module 84 may change a message priority level of the message after message has been stored in a queue to affect a modified message transmission order. The storage module 84 may delete the message stored in the queue when the message is no longer required. The method to determine whether the message is no longer required, to delete the message, and to change the message priority is discussed in greater detail with reference to FIGS. 6B-10.

Figure 9B:
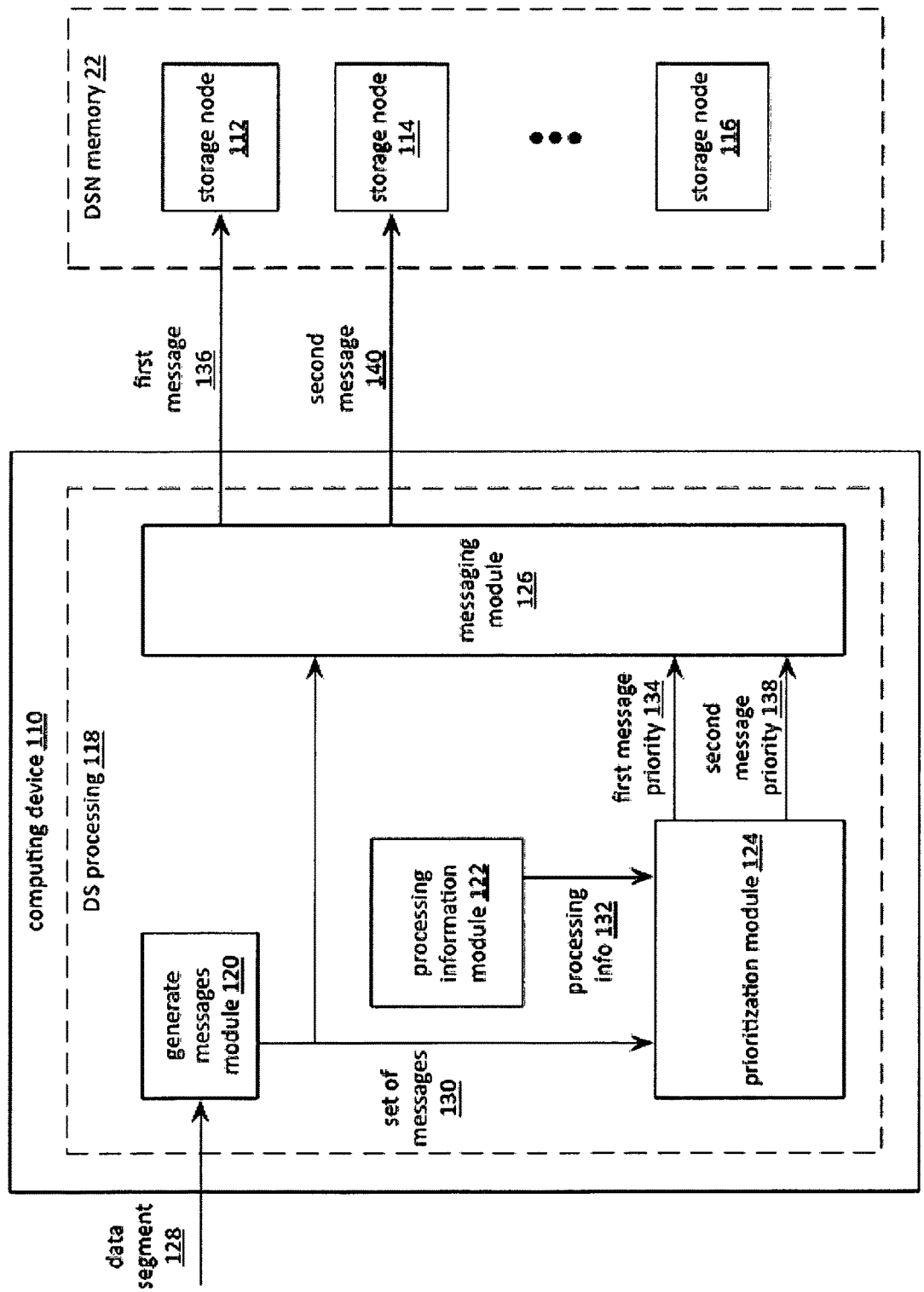
FIG. 9B is a schematic block diagram of an embodiment of computing system in accordance with the present invention.

FIG. 9B is a schematic block diagram of another embodiment of a computing system that includes a computing device 110 and a dispersed storage network (DSN) memory 22 of a dispersed storage network. The DSN memory 22 includes a plurality of storage nodes 112-116. The computing device 110 includes a dispersed storage (DS) processing 118. The computing device 110 may be implemented as at least one of a user device, a DS processing unit, and a DS unit. The DS processing 118 includes a generate messages module 120, a processing information module 122, a prioritization module 124, and a messaging module 126. The system functions to access the DSN memory 22 with regards to a set of encoded data slices. The accessing includes at least one of reading the set of encoded data slices from the DSN memory 22 and writing the set of encoded data slices to the DSN memory 22. A data segment 128 of data is encoded using a dispersed storage error coding function to produce the set of encoded data slices. The generate messages module 120 receives the data segment 128 when the accessing includes writing the set of encoded data slices to the DSN memory 22. For example, the generate messages module 120 receives the data segment 128 and encodes the data segment 128 to produce the set of encoded data slices when the accessing includes writing the set of encoded data slices to the DSN memory 22. As another example, the DS processing 118 generates the data segment 128 and encodes the data segment 128 to produce the set of encoded data slices when the accessing includes writing the set of encoded data slices to the DSN memory 22. Alternatively, the generate messages module 120 receives the set of encoded data slices.

The generate messages module 120 generates a set of messages 130 regarding the set of encoded data slices. The set of messages 130 includes a set of read messages to read the set of encoded data slices from the DSN memory 22 when the accessing includes reading the set of encoded data slices from the DSN memory 22. A read message of the set of read messages includes a read slice request. For example, the generate messages module 120 generates a set of read slice requests that includes a set of slice names corresponding to the set of encoded data slices. The set of messages 130 includes a set of write messages to write the set of encoded data slices to the DSN memory 22 when the accessing includes writing the set of encoded data slices to the DSN memory 22. A write message of the set of write messages includes a write slice request. For example, the generate messages module 120 generates a set of write slice requests that includes the set of encoded data slices and the set of slice names corresponding to the set of encoded data slices.

The processing information module 122 determines system-level message processing information 132 based on status of processing a plurality of sets of messages regarding a plurality of sets of encoded data slices. The plurality of sets of messages regarding the plurality of sets of encoded data slices may include numerous other write and read accesses of other encoded data slices within at least one storage node of the plurality of storage nodes 112-116. The processing information module 122 determines the system-level message processing information 132 by a series of steps. A first step includes, for a first set of messages of the plurality of sets of messages, determining at least one of: a current status of sending the first set of messages (e.g., the first set of messages have been sent to the DSN memory 22), and a current status of successfully processing the first set of messages. The determining includes at least one of initiating a query, performing a lookup, executing a test, accessing historical records, and accessing the messaging module 126. The processing of the first set of messages includes at least one of retrieving and writing the set of encoded data slices. For example, a current status of sending the first set of messages indicates that 5 messages of a set of 16 messages have been sent. Successfully processing the first set of messages may include at least one of retrieving at least a decode threshold number of encoded data slices of the set of encoded data slices and writing at least a write threshold number of encoded data slices of the set of encoded data slices. For example, a current status of successfully processing the first set of messages indicates successful processing when 11 encoded data slices have been retrieved when a decode threshold number is 10. As another example, a current status of successfully processing the first set of messages indicates unsuccessful processing when 12 encoded data slices have been sent when a write threshold number is 13.

A second step of determining the system-level message processing information includes, for a second set of messages of the plurality of sets of messages, determining at least one of: a current status of sending the second set of messages, and a current status of successfully processing the second set of messages. Alternatively, or in addition to, more steps may be included in the series of steps including determining status with regards to further sets of messages of the plurality of sets of messages. A third step includes, determining the status of processing the plurality of sets of messages regarding the plurality of sets of encoded data slices based on the at least one of the current status of sending the first set of messages and the current status of successfully processing of the first set of messages, and the at least one of the current status of sending the second set of messages, and the current status of successfully processing of the second set of messages. The determining includes at least one of aggregating status, selecting status, and confirming status. For example, the processing information module 122 determines the status of processing the plurality sets of messages regarding the plurality of sets of encoded data slices by aggregating current status associated with 10 sets of messages when the plurality of sets of messages includes 10 sets of messages.

For a first message 136 of the set of messages 130, the prioritization module 124 determines a first message priority 134 based on the system-level message processing information 132 and message processing status of a first storage node 112 of the plurality of storage nodes 112-116. The prioritization module 124 determines the message processing status of the first storage node 112 by a series of steps. A first step includes determining a number of sets of the plurality of sets of messages that involves the first storage node (e.g., messages to be sent to the first storage node 112). A second step includes determining status of sending messages of the number of sets of the plurality of sets of messages to the first storage node 112. A third step includes determining status of successfully processed messages of the number of sets of the plurality of sets of messages by the first storage node 112. A fourth step includes determining the message processing status of the first storage node 112 based on the status of sending messages and the status of successfully processed messages.

The prioritization module 124 determines the first message priority 134 by a series of steps. A first step includes determining the number of sets of the plurality of sets of messages that involves the first storage node 112. A second step includes interpreting the system-level message processing information 132 regarding the number of sets that involve the first storage node 112 to produce interpreted system-level message processing information. A third step includes interpreting the message processing status of the first storage node 112 regarding the number of sets that involve the first storage node 112 to produce interpreted message processing status. A fourth step includes applying a load balancing function in accordance the interpreted system-level message processing information and the interpreted message processing status to produce the first message priority 134. The load balancing function includes at least one of a first in first out function, a last in first out function, a time-based function, and a threshold-based function. For example, the prioritization module 124 produces the first message priority 134 to include a lower than average priority level when the interpreted system-level message processing information indicates that a plurality of other messages are pending to be sent to the first storage node 112 where the plurality of other messages are associated with sets of encoded data slices that have not achieved processing of a threshold number of each set of the sets of encoded data slices. The messaging module 126 sends the first message 136 of the set of messages 130 to the first storage node 112 in accordance with the first message priority 134. For example, the messaging module 126 sends the first message 136 to the first storage node 112 subsequent to sending another message to the first storage node 112 when a message priority of the other message has greater priority than priority of the first message priority 134.

For a second message 140 of the set of messages 130, the prioritization module 124 determines a second message priority 138 based on the system-level message processing information 132 and message processing status of a second storage node 114 of the plurality of storage nodes 112-116. The messaging module 126 sends the second message 140 of the set of messages 130 to the second storage node 114 in accordance with the second message priority 138. For example, the messaging module 126 sends the second message 140 to the second storage node 114 prior to sending a different message to the second storage node 114 when a message priority of the different message has less priority than priority of the second message priority 138.

The system further functions to update message priorities. The prioritization module 124 updates the first message priority 134 based on status of processing the set of messages 130. The prioritization module 124 updates the second message priority 138 based on status of processing the set of messages 130. The updating of message priority includes updating message priority associated with writing the set of encoded data slices to the DSN memory 22 and reading the set of encoded data slices from the DSN memory 22. The status of processing the sets of messages 130 includes status with regards to at least one of a number of messages of the set of messages that have been sent and/or processed and a number of messages of the set of messages that have been sent and/or processed within a given time period.

When the set of messages 130 includes the set of write messages to write the set of encoded data slices to the DSN memory 22, the messaging module 126 determines when a write threshold number of the set of write messages have been sent to the DSN memory 22. When the write threshold number of the set of write messages have been sent and the first message 136 has not yet been sent to the first storage node 112, the prioritization module 124 reduces the first message priority 134. Alternatively, the messaging module 126 determines when a write threshold number of the set of write messages have been successfully processed by the DSN memory 22. When the write threshold number of the set of write messages have been successfully processed and the first message 136 has not yet been sent to the first storage node 112, the prioritization module 124 reduces the first message priority 134.

When the set of messages 130 includes the set of read messages to read the set of encoded data slices from the DSN memory 22, the messaging module 126 determines when a decode threshold number of the set of read messages have been sent to the DSN memory 22. When the decode threshold number of the set of read messages have been sent and the first message 136 has not yet been sent to the first storage node 112, the prioritization module 124 reduces the first message priority 134. Alternatively, the messaging module 126 determines when a decode threshold number of the set of read messages have been successfully processed by the DSN memory 22. When the decode threshold number of the set of read messages have been successfully processed and the first message 136 has not yet been sent to the first storage node 112, the prioritization module 124 reduces the first message priority 134.

When the set of messages 130 includes the set of write messages to write the set of encoded data slices to the DSN memory 22, the messaging module 126 determines that a write threshold number of the set of write messages have not been sent to DSN memory 22 within a given time frame. When the write threshold number of the set of write messages have not been sent in the given time period and the first message 136 has not yet been sent to the first storage node 112 within the given time period, the prioritization module 124 increases the first message priority 134.

Alternatively, when the set of messages 130 includes the set of write messages to write the set of encoded data slices to the DSN memory 22, the messaging module 126 determines when a write threshold number of the set of write messages have not been successfully processed by the DSN memory 22 within a given time period. When the write threshold number of the set of write messages have not been successfully processed within the given time period and the first message 136 has not yet been sent to the first storage node 112, the prioritization module 124 increases the first message priority 134.

When the set of messages includes a set of read messages to read the set of encoded data slices from the DSN memory 22, the messaging module 126 determines when a decode threshold number of the set of read messages have not been sent to the DSN memory 22 within a given time period. When the decode threshold number of the set of read messages have not been sent within the given time period and the first message 136 has not yet been sent to the first storage node 112 in the given time period, the prioritization module 124 increases the first message priority 134.

Alternatively, when the set of messages 130 includes the set of read messages to read the set of encoded data slices from the DSN memory 22, the messaging module 126 determines when a decode threshold number of the set of read messages have not been successfully processed by the DSN memory 22 within a given time period. When the decode threshold number of the set of read messages have not been successfully processed within the given time period and the first message 136 has not yet been sent to the first storage node 112, the prioritization module 124 increases the first message priority 134.

Figure 10:
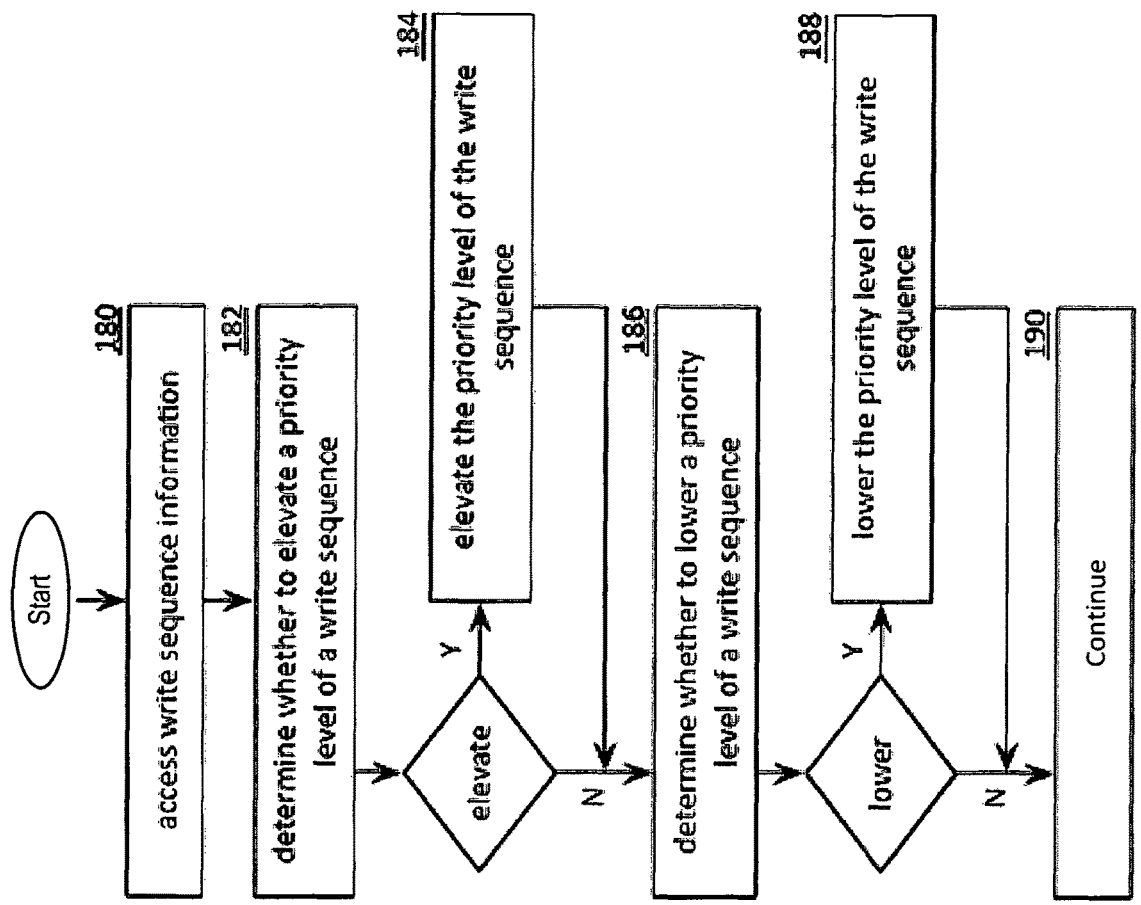
FIG. 10 is a logic diagram of an example of a method of in accordance with the present invention.

FIG. 10 is a flowchart illustrating another example of modifying a write sequence. In particular, a method is presented for use with one or more functions and features described in conjunction with FIGS. 1-8 and 9A and 9B. In step 180, a processing module (e.g., of a dispersed storage (DS) processing module) accesses write sequence information. The write sequence information includes one or more of a queue depth, a priority level of a pending request, age of a pending request, number of favorable write responses received so far, and a write threshold number. The accessing may be based on one or more of retrieving a message queue, lookup, receiving a request, a query, and an error message.

The method continues at step 182 where the processing module determines whether to elevate a priority level of a write sequence. The priority level of the write sequence may be utilized in determining a transmission order of two or more pending write request messages of a common queue such that a write request associated with a higher priority level is transmitted prior to a write request associated with a lower priority level. The determining may be based on of the access write sequence information. For example, the processing module determines to elevate the priority level of the write sequence when the write sequence is associated with an oldest write sequence of a plurality of write sequences that has not received a write threshold number of favorable write responses. Each write sequence of the plurality of write sequences may be associated with a different write threshold number. As another example, the processing module determines to elevate the priority level of the write sequence when the write sequence is associated with a highest priority write sequence of the plurality of write sequences that has not received the write threshold number of favorable write responses.

The method branches to step 186 when the processing module determines not to elevate the priority level of the write sequence. The method continues to step 184 when the processing module determines to elevate the priority level of the write sequence. The method continues at step 184 where the processing module elevates the priority level of the write sequence. The elevating of the priority level includes at least one of modifying a priority level indicator of an associated write request in a message queue to include a higher priority level number and reordering pending write requests in the queue such that highest priority requests will be transmitted next. The method continues to step 186.

The method continues at step 186 where the processing module determines whether to lower the priority level of the write sequence. The determining may be based on write sequence information. For example, the processing module determines to lower the priority level of the write sequence when the write sequence is associated with a write sequence of a plurality of write sequences that has received a write threshold number of favorable write responses. As another example, the processing module determines to lower the priority level of the write sequence when the write sequence is associated with a highest priority write sequence of the plurality of write sequences that has received the write threshold number of favorable write responses.

The method branches to step 190 when the processing module determines not to lower the priority level of the write sequence. The method continues to step 188 when the processing module determines to lower the priority level of the write sequence. The method continues at step 188 where the processing module lowers the priority level of the write sequence. The lowering of the priority level includes at least one of modifying a priority level indicator of an associated write request in a message queue to include a lower priority level number and reordering pending write requests in the queue such that highest priority requests will be transmitted next. The method continues to step 190. The method continues at step 190 where the method can be repeated as required.

In various embodiments, a non-transitory computer readable storage medium includes at least one memory section that stores operational instructions that, when executed by a processing system of a dispersed storage network (DSN) that includes a processor and a memory, causes the processing system to access write sequence information corresponding to a write sequence; determine whether to elevate a priority level of the write sequence; when the processing system determines to elevate the priority level of the write sequence, elevate the priority level of the write sequence; determine whether to lower the priority level of the write sequence; and when the processing system determines to lower the priority level of the write sequence, lower the priority level of the write sequence.

It is noted that terminologies as may be used herein such as bit stream, stream, signal sequence, etc. (or their equivalents) have been used interchangeably to describe digital information whose content corresponds to any of a number of desired types (e.g., data, video, speech, audio, etc. any of which may generally be referred to as 'data').

As may be used herein, the terms "substantially" and "approximately" provides an industry-accepted tolerance for its corresponding term and/or relativity between items. Such an industry-accepted tolerance ranges from less than one percent to fifty percent and corresponds to, but is not limited to, component values, integrated circuit process variations, temperature variations, rise and fall times, and/or thermal noise. Such relativity between items ranges from a difference of a few percent to magnitude differences. As may also be used herein, the term(s) "configured to", "operably coupled to", "coupled to", and/or "coupling" includes direct coupling between items and/or indirect coupling between items via an intervening item (e.g., an item includes, but is not limited to, a component, an element, a circuit, and/or a module) where, for an example of indirect coupling, the intervening item does not modify the information of a signal but may adjust its current level, voltage level, and/or power level. As may further be used herein, inferred coupling (i.e., where one element is coupled to another element by inference) includes direct and indirect coupling between two items in the same manner as "coupled to". As may even further be used herein, the term "configured to", "operable to", "coupled to", or "operably coupled to" indicates that an item includes one or more of power connections, input(s), output(s), etc., to perform, when activated, one or more its corresponding functions and may further include inferred coupling to one or more other items. As may still further be used herein, the term "associated with", includes direct and/or indirect coupling of separate items and/or one item being embedded within another item.

As may be used herein, the term "compares favorably", indicates that a comparison between two or more items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1. As may be used herein, the term "compares unfavorably", indicates that a comparison between two or more items, signals, etc., fails to provide the desired relationship.

As may also be used herein, the terms "processing module", "processing circuit", "processor", and/or "processing unit" may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions. The processing module, module, processing circuit, and/or processing unit may be, or further include, memory and/or an integrated memory element, which may be a single memory device, a plurality of memory devices, and/or embedded circuitry of another processing module, module, processing circuit, and/or processing unit. Such a memory device may be a read-only memory, random access memory, volatile memory, non-volatile memory, static memory, dynamic memory, flash memory, cache memory, and/or any device that stores digital information. Note that if the processing module, module, processing circuit, and/or processing unit includes more than one processing device, the processing devices may be centrally located (e.g., directly coupled together via a wired and/or wireless bus structure) or may be distributedly located (e.g., cloud computing via indirect coupling via a local area network and/or a wide area network). Further note that if the processing module, module, processing circuit, and/or processing unit implements one or more of its functions via a state machine, analog circuitry, digital circuitry, and/or logic circuitry, the memory and/or memory element storing the corresponding operational instructions may be embedded within, or external to, the circuitry comprising the state machine, analog circuitry, digital circuitry, and/or logic circuitry. Still further note that, the memory element may store, and the processing module, module, processing circuit, and/or processing unit executes, hard coded and/or operational instructions corresponding to at least some of the steps and/or functions illustrated in one or more of the Figures. Such a memory device or memory element can be included in an article of manufacture.

One or more embodiments have been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claims. Further, the boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality.

To the extent used, the flow diagram block boundaries and sequence could have been defined otherwise and still perform the certain significant functionality. Such alternate definitions of both functional building blocks and flow diagram blocks and sequences are thus within the scope and spirit of the claims. One of average skill in the art will also recognize that the functional building blocks, and other illustrative blocks, modules and components herein, can be implemented as illustrated or by discrete components, application specific integrated circuits, processors executing appropriate software and the like or any combination thereof.

In addition, a flow diagram may include a "start" and/or "continue" indication. The "start" and "continue" indications reflect that the steps presented can optionally be incorporated in or otherwise used in conjunction with other routines. In this context, "start" indicates the beginning of the first step presented and may be preceded by other activities not specifically shown. Further, the "continue" indication reflects that the steps presented may be performed multiple times and/or may be succeeded by other activities not specifically shown. Further, while a flow diagram indicates a particular ordering of steps, other orderings are likewise possible provided that the principles of causality are maintained.

The one or more embodiments are used herein to illustrate one or more aspects, one or more features, one or more concepts, and/or one or more examples. A physical embodiment of an apparatus, an article of manufacture, a machine, and/or of a process may include one or more of the aspects, features, concepts, examples, etc. described with reference to one or more of the embodiments discussed herein. Further, from figure to figure, the embodiments may incorporate the same or similarly named functions, steps, modules, etc. that may use the same or different reference numbers and, as such, the functions, steps, modules, etc. may be the same or similar functions, steps, modules, etc. or different ones.

Unless specifically stated to the contra, signals to, from, and/or between elements in a figure of any of the figures presented herein may be analog or digital, continuous time or discrete time, and single-ended or differential. For instance, if a signal path is shown as a single-ended path, it also represents a differential signal path. Similarly, if a signal path is shown as a differential path, it also represents a single-ended signal path. While one or more particular architectures are described herein, other architectures can likewise be implemented that use one or more data buses not expressly shown, direct connectivity between elements, and/or indirect coupling between other elements as recognized by one of average skill in the art.

The term "module" is used in the description of one or more of the embodiments. A module implements one or more functions via a device such as a processor or other processing device or other hardware that may include or operate in association with a memory that stores operational instructions. A module may operate independently and/or in conjunction with software and/or firmware. As also used herein, a module may contain one or more sub-modules, each of which may be one or more modules.

As may further be used herein, a computer readable memory includes one or more memory elements. A memory element may be a separate memory device, multiple memory devices, or a set of memory locations within a memory device. Such a memory device may be a read-only memory, random access memory, volatile memory, non-volatile memory, static memory, dynamic memory, flash memory, cache memory, and/or any device that stores digital information. The memory device may be in a form a solid state memory, a hard drive memory, cloud memory, thumb drive, server memory, computing device memory, and/or other physical medium for storing digital information.

While particular combinations of various functions and features of the one or more embodiments have been expressly described herein, other combinations of these features and functions are likewise possible. The present disclosure is not limited by the particular examples disclosed herein and expressly incorporates these other combinations.

What is claimed is:

1. A method for execution by a dispersed storage and task (DST) processing unit that includes a processor, the method comprises:

accessing, via the processor, write sequence information corresponding to a write sequence;

elevating a priority level of the write sequence, via the processor, when the write sequence information indicates the write sequence is associated with an oldest write sequence of a plurality of other write sequences that has not received a write threshold number of favorable write responses; and determining, via the processor, when to lower the priority level of the write sequence and lowering the priority level of the write sequence in response thereto.

2. The method of claim 1 wherein the write sequence information includes one or more of: a queue depth, a priority level of a pending request, an age of a pending request, a number of favorable write responses received, and the write threshold number.

3. The method of claim 1 wherein the accessing is based on one or more of: retrieving a message queue, a lookup, receiving a request, a query, and an error message.

4. The method of claim 1 wherein the priority level of the write sequence is utilized in determining a transmission order of two or more pending write request messages of a common queue, wherein a write request associated with a higher priority level is transmitted prior to a write request associated with a lower priority level.

5. The method of claim 1 wherein at least one of the plurality of other write sequences is associated with a different write threshold number.

6. The method of claim 1 wherein determining to elevate the priority level of the write sequence is further based on determining when the write sequence is associated with a highest priority write sequence of the plurality of other write sequences that has not received the write threshold number of favorable write responses.

7. The method of claim 1 wherein elevating of the priority level includes at least one of: modifying a priority level indicator of an associated write request in a queue to include a higher priority level number, and reordering pending write requests in the queue such that highest priority requests will be transmitted after the associated write request.

8. The method of claim 1 wherein determining to lower the priority level of the write sequence is based on the write sequence information.

9. The method of claim 1 wherein determining to elevate the priority level of the write sequence is further based on determining when the write sequence is associated with another write sequence of the plurality of other write sequences that has received the write threshold number of favorable write responses.

10. The method of claim 1 wherein determining to elevate the priority level of the write sequence is further based on determining when the write sequence is associated with a highest priority write sequence of the plurality of other write sequences that has received the write threshold number of favorable write responses.

11. The method of claim 1 wherein lowering of the priority level includes at least one of: modifying a priority level indicator of an associated write request in a queue to include a lower priority level number, or reordering pending write requests in the queue such that highest priority requests will be transmitted before the associated write request.

12. A processing system of a dispersed storage network comprises:

at least one processor;

a memory that stores operational instructions, that when executed by the at least one processor cause the processing system to perform operations including:
- accessing, via the processor, write sequence information corresponding to a write sequence;
- elevating a priority level of the write sequence, via the processor, when the write sequence information indicates the write sequence is associated with an oldest write sequence of a plurality of other write sequences that has not received a write threshold number of favorable write responses; and
- determining, via the processor, when to lower the priority level of the write sequence and lowering the priority level of the write sequence in response thereto.

13. The processing system of claim 12 wherein the write sequence information includes one or more of: a queue depth, a priority level of a pending request, an age of a pending request, a number of favorable write responses received, and the write threshold number.

14. The processing system of claim 12 wherein the priority level of the write sequence is utilized in determining a transmission order of two or more pending write request messages of a common queue, wherein a write request associated with a higher priority level is transmitted prior to a write request associated with a lower priority level.

15. The processing system of claim 12 wherein lowering of the priority level includes at least one of: modifying a priority level indicator of an associated write request in a queue to include a lower priority level number, or reordering pending write requests in the queue such that highest priority requests will be transmitted before the associated write request.

16. The processing system of claim 12 wherein determining to lower the priority level of the write sequence is based on the write sequence information.

17. The processing system of claim 12 wherein elevating of the priority level includes at least one of: modifying a priority level indicator of an associated write request in a queue to include a higher priority level number, and reordering pending write requests in the queue such that highest priority requests will be transmitted after the associated write request.

18. A non-transitory computer readable storage medium comprises:
at least one memory section that stores operational instructions that, when executed by a processing system of a dispersed storage network (DSN) that includes a processor and a memory, causes the processing system to perform operations including:
- accessing, via the processor, write sequence information corresponding to a write sequence;
- elevating a priority level of the write sequence, via the processor, when the write sequence information indicates the write sequence is associated with an oldest write sequence of a plurality of other write sequences that has not received a write threshold number of favorable write responses; and
- determining, via the processor, when to lower the priority level of the write sequence and lowering the priority level of the write sequence in response thereto.

19. The non-transitory computer readable storage medium of claim 18 wherein lowering of the priority level includes at least one of: modifying a priority level indicator of an associated write request in a queue to include a lower priority level number, or reordering pending write requests in the queue such that highest priority requests will be transmitted before the associated write request.

20. The non-transitory computer readable storage medium of claim 18 wherein elevating of the priority level includes at least one of: modifying a priority level indicator of an associated write request in a queue to include a higher priority level number, and reordering pending write requests in the queue such that highest priority requests will be transmitted after the associated write request.

* * * * *